United States Patent
Kwon et al.

(10) Patent No.: US 9,902,808 B2
(45) Date of Patent: Feb. 27, 2018

(54) COPOLYMERIZED POLYAMIDE RESIN, METHOD FOR PREPARING THE SAME AND MOLDED ARTICLE COMPRISING THE SAME

(71) Applicant: Samsung SDI Co., Ltd., Yongin-si (KR)

(72) Inventors: So Young Kwon, Uiwang-si (KR); Jin Kyu Kim, Uiwang-si (KR); Young Sub Jin, Uiwang-si (KR); Joon Sung Kim, Uiwang-si (KR); Ki Yon Lee, Uiwang-si (KR); Suk Min Jun, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 79 days.

(21) Appl. No.: 14/583,429

(22) Filed: Dec. 26, 2014

(65) Prior Publication Data

US 2016/0090448 A1    Mar. 31, 2016

(30) Foreign Application Priority Data

Sep. 25, 2014  (KR) .................. 10-2014-0128684

(51) Int. Cl.
  *C08G 69/26*  (2006.01)
  *C08G 69/30*  (2006.01)

(52) U.S. Cl.
  CPC ........... *C08G 69/265* (2013.01); *C08G 69/30* (2013.01)

(58) Field of Classification Search
  None
  See application file for complete search history.

(56) References Cited

U.S. PATENT DOCUMENTS

| | | | | |
|---|---|---|---|---|
| 6,166,171 A * | 12/2000 | Yamamoto | ............. | C08G 69/30 428/220 |
| 2006/0122360 A1 * | 6/2006 | Tsujii | ................... | C08G 69/28 528/310 |
| 2012/0177937 A1 | 7/2012 | Ogawa et al. | | |
| 2013/0065005 A1 | 3/2013 | Yamamoto et al. | | |
| 2015/0344642 A1 | 12/2015 | Yamamoto et al. | | |

FOREIGN PATENT DOCUMENTS

KR  10-2012-0060216 A  6/2012
KR  10-2013-0114564 A  10/2013

* cited by examiner

*Primary Examiner* — Rachel Kahn
(74) *Attorney, Agent, or Firm* — Additon, Higgins & Pendleton, P.A.

(57) ABSTRACT

A copolymerized polyamide resin includes a polymer of a monomer mixture comprising a dicarboxylic acid component comprising adipic acid and a dicarboxylic acid represented by Formula 1, wherein each $R_1$ is independently a $C_1$ to $C_5$ alkyl group and a is an integer from 0 to 4, and a diamine component comprising m-xylene diamine and a diamine represented by Formula 2, wherein A is a single bond or a $C_1$ to $C_{10}$ hydrocarbon group, $R_2$ and $R_3$ are each independently a $C_1$ to $C_5$ alkyl group, and b and c are each independently an integer from 0 to 4, wherein the copolymerized polyamide resin has a difference between a melting temperature (Tm) and a crystallization temperature (Tc) of about 50° C. or more. The copolymerized polyamide resin may have excellent heat resistance and reduced or no gel generation and yellowing phenomenon in a molding process.

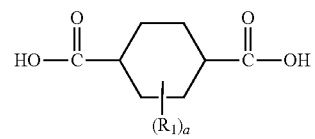

[Formula 1]

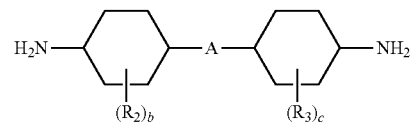

[Formula 2]

13 Claims, No Drawings

COPOLYMERIZED POLYAMIDE RESIN, METHOD FOR PREPARING THE SAME AND MOLDED ARTICLE COMPRISING THE SAME

CROSS-REFERENCE TO RELATED APPLICATION

This application claims priority under 35 USC Section 119 to and the benefit of Korean Patent Application 10-2014-0128684, filed Sep. 25, 2014, the entire disclosure of which is incorporated herein by reference.

FIELD OF THE INVENTION

The present invention relates to a copolymerized polyamide resin, a method for preparing the same, and a molded article comprising the same.

BACKGROUND

Among commercialized polyamide resins (nylons), poly(m-xylene adipamide) (MXD6) has been used in a variety of applications, such as film materials, injection molding materials, and the like due to its excellent rigidity, gas-barrier property, etc. MXD6 has an advantage over other nylons, because there are few problems associated with the protrusion of inorganic fillers, for example, glass fibers, from a surface of an article produced in an injection molding process due to slowed crystallization rate. Thus, MXD6 can provide molded products with a superior appearance due to reduced surface roughness.

PET/MXD6/PET, PA6/MXD6/PA6, and the like have been used as multilayer packaging films. Such multilayer films have been primarily prepared by a coextrusion process. However, MXD6 can be further polymerized by the heat generated during the extrusion of MXD6 to increase its molecular weight and melt viscosity, thereby making the extrusion process unstable. Furthermore, gel generation during extrusion can result in a poor appearance of the film, such as pin holes or fish eyes, etc. Gel generation can also reduce workability. Generally, it is known that a benzyl methyl structure included in MXD6 may form radicals under high temperature and oxygen contact conditions, thereby resulting in an increase in the molecular weight, gel forming, and the like.

Furthermore, MXD6 may have a reduced resistance to hot-humid external environments, since it has a reduced heat resistance compared with other high temperature resistant nylons.

Therefore, there is a need for a MXD6 based copolymerized polyamide resin that can reduce or prevent gel generation and can have improved heat resistance to expand the uses for MXD6 based polyamide resin.

SUMMARY

The present invention provides a MXD6 based copolymerized polyamide resin that can have excellent heat resistance, reduced or no gel generation, and reduced yellowing phenomenon in a molding process by including an alicyclic dicarboxylic acid and an alicyclic diamine comprising two or more cyclohexyl groups, a method for preparing the same, and a molded article comprising the same.

The copolymerized polyamide resin is a polymer of a monomer mixture comprising a dicarboxylic acid component comprising adipic acid and a dicarboxylic acid represented by Formula 1, and a diamine component comprising m-xylene diamine and a diamine represented by Formula 2, wherein the copolymerized polyamide resin has a difference between a melting temperature (Tm) and a crystallization temperature (Tc) of about 50° C. or more:

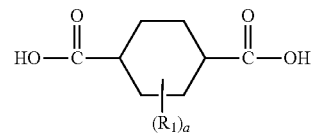

[Formula 1]

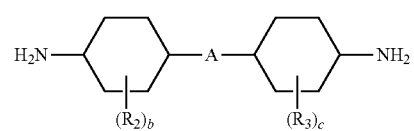

[Formula 2]

wherein, A is a single bond or a $C_1$ to $C_{10}$ hydrocarbon group, $R_1$, $R_2$ and $R_3$ are the same or different and are each independently a $C_1$ to $C_5$ alkyl group, and a, b and c are the same or different and are each independently an integer from 0 to 4.

In exemplary embodiments, the adipic acid may be present in an amount from about 88 to about 95 mol % in the dicarboxylic acid component, the dicarboxylic acid represented by Formula 1 may be present in an amount from about 5 to about 12 mol % in the dicarboxylic acid component, the m-xylene diamine may be present in an amount from about 80 to about 95 mol % in the diamine component, and the diamine represented by Formula 2 may be present in an amount from about 5 to about 20 mol % in the diamine component.

In exemplary embodiments, the copolymerized polyamide resin may have a mole ratio of the dicarboxylic acid component and the diamine component (dicarboxylic acid component:diamine component) from about 1:about 0.95 to about 1:about 1.15.

In exemplary embodiments, the copolymerized polyamide resin may have a terminal group encapsulated with an end capping agent comprising at least one of an aliphatic carboxylic acid and an aromatic carboxylic acid.

In exemplary embodiments, the copolymerized polyamide resin may have a melting temperature (Tm) from about 220 to about 250° C., a crystallization temperature (Tc) from about 170 to about 200° C., and a glass transition temperature (Tg) from about 90 to about 110° C.

In exemplary embodiments, the copolymerized polyamide resin may have an intrinsic viscosity (IV) difference (ΔIV) of about 0.14 or less according to Equation 1 as below:

$$\text{Intrinsic viscosity difference}(\Delta IV) = IV_1 - IV_0 \quad \text{[Equation 1]}$$

wherein $IV_0$ is an intrinsic viscosity of the copolymerized polyamide resin, as measured at about 25° C., and $IV_1$ is an intrinsic viscosity, as measured by melting about 10 g of the copolymerized polyamide resin at about 260° C. and leaving the melted copolymerized polyamide resin for about 30 minutes, followed by cooling it to about 25° C.

In exemplary embodiments, the copolymerized polyamide resin may have a gel content of about 0.4% or less for a sample of about 10 g, as measured by melting about 10 g of the sample at about 260° C. and leaving the melted sample for about 30 minutes, followed by cooling it to an ambient temperature.

In exemplary embodiments, the copolymerized polyamide resin may have a Yellowness Index difference (ΔYI) of about 20 or less, wherein the ΔYI is determined by measuring the YI of a copolymerized polyamide resin sample before and after a scorch test, wherein the scorch test includes leaving about 1 to about 3 g of the resin at about 200° C. for about 1 hour.

The present invention also relates to a method for preparing the copolymerized polyamide resin. The method includes polymerizing a monomer mixture comprising a dicarboxylic acid component comprising adipic acid and a dicarboxylic acid represented by Formula 1, and a diamine component comprising m-xylene diamine and a diamine represented by Formula 2, wherein the copolymerized polyamide resin has a difference between a melting temperature (Tm) and a crystallization temperature (Tc) of about 50° C. or more.

In exemplary embodiments, the method may comprise polymerizing the monomer mixture to obtain a prepolymer; and performing a solid state polymerization of the prepolymer.

In exemplary embodiments, the prepolymer may have an intrinsic viscosity from about 0.1 to about 0.4 dL/g.

In exemplary embodiments, the solid state polymerization may comprise heating the prepolymer to a temperature of about 150 to about 220° C.

The present invention further relates to a molded article formed from the copolymerized polyamide resin.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The copolymerized polyamide resin according to the present invention is a polymer of a monomer mixture comprising (A) a dicarboxylic acid component comprising (a1) adipic acid and (a2) an alicyclic dicarboxylic acid, and (B) a diamine component comprising (b1) m-xylene diamine and (b2) an alicyclic diamine comprising two or more cyclohexyl groups, wherein the copolymerized polyamide resin has a difference between a melting temperature (Tm) and a crystallization temperature (Tc) of about 50° C. or more.

As used herein, the term "dicarboxylic acid (component)" refers to dicarboxylic acids, alkyl esters thereof ($C_1$ to $C_4$ lower alkyl esters, such as monomethyl, monoethyl, dimethyl, diethyl, dibutyl esters, and the like), acid anhydrides thereof, and the like, and mixtures thereof, and forms the dicarboxylic acid moieties through a reaction with a diamine (component). In addition, as used herein, the dicarboxylic acid moieties and the diamine moieties mean residues remaining after removal of hydrogen atoms, hydroxyl groups and/or alkoxy groups upon polymerization of the dicarboxylic acid component and the diamine component.

(A) Dicarboxylic Acid Component

The dicarboxylic acid component (A) used in the present invention may comprise (a1) adipic acid and (a2) an alicyclic dicarboxylic acid, for example, a dicarboxylic acid represented by Formula 1:

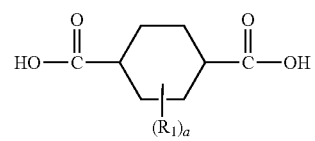

[Formula 1]

wherein, each $R_1$ is the same or different and each is independently a $C_1$ to $C_5$ alkyl group, for example a methyl group, an ethyl group, a propyl group, a butyl group, and the like, and a is an integer from 0 to 4.

Examples of the dicarboxylic acids represented by Formula 1 may include, without limitation, 1,4-cyclohexane dicarboxylic acid, 2-methylcyclohexane-1,4-dicarboxylic acid, 2,5-dimethylcyclohexane-1,4-dicarboxylic acid, and the like, and mixtures thereof.

In exemplary embodiments, the dicarboxylic acid component may include adipic acid in an amount from about 88 to about 95 mol %, for example, about 90 to about 95 mol %, based on about 100 mol % of the dicarboxylic acid component. In some embodiments, the dicarboxylic acid component may include adipic acid in an amount of about 88, 89, 90, 91, 92, 93, 94, or 95 mol %. Further, according to some embodiments of the present invention, the amount of adipic acid can be in a range from about any of the foregoing amounts to about any other of the foregoing amounts.

In exemplary embodiments, the dicarboxylic acid component may include the dicarboxylic acid represented by Formula 1 in an amount from about 5 to about 12 mol %, for example, about 5 to about 10 mol %, based on about 100 mol % of the dicarboxylic acid component. In some embodiments, the dicarboxylic acid component may include the dicarboxylic acid represented by Formula 1 in an amount of about 5, 6, 7, 8, 9, 10, 11, or 12 mol %. Further, according to some embodiments of the present invention, the amount of the dicarboxylic acid represented by Formula 1 can be in a range from about any of the foregoing amounts to about any other of the foregoing amounts.

Within these ranges, the obtained copolymerized polyamide resin may have a reduced crystallization rate and an increased glass transition temperature (Tg) over existing resins, and thus may have excellent thermal stability, and further may exhibit reduced or no gel generation and/or yellowing phenomenon in a molding process.

(B) Diamine Component

The diamine component (B) used in the present invention may comprise (b1) m-xylene diamine and (b2) an alicyclic diamine comprising two or more cyclohexyl groups, for example, the diamine represented by Formula 2:

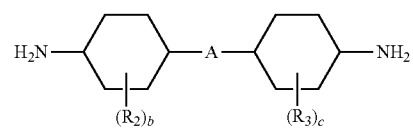

[Formula 2]

wherein, A is a single bond or a $C_1$ to $C_{10}$ hydrocarbon group, for example, a linear or branched $C_1$ to $C_{10}$ aliphatic hydrocarbon group, $C_6$ to $C_{10}$ alicyclic hydrocarbon group, and the like, and as another example a single bond, a methylene group, an ethylene group, a propylene group, a cyclohexylene group, and the like, $R_2$ and $R_3$ are the same or different and may be each independently a $C_1$ to $C_5$ alkyl group, for example, a methyl group, an ethyl group, a propyl group, a butyl group, and the like, and b and c are the same or different and are each independently an integer from 0 to 4.

Examples of the diamine represented by Formula 2 may include, without limitation, bis(p-aminocyclohexyl)methane (PACM), bis-(p-amino-3-methyl-cyclohexyl)methane (MACM), and the like, and mixtures thereof.

In exemplary embodiments, the diamine component may include m-xylene diamine in an amount from about 80 to about 95 mol %, for example, about 85 to about 95 mol %, based on about 100 mol % of the diamine component. In some embodiments, the diamine component may include m-xylene diamine in an amount of about 80, 81, 82, 83, 84, 85, 86, 87, 88, 89, 90, 91, 92, 93, 94, or 95 mol %. Further, according to some embodiments of the present invention, the amount of m-xylene diamine can be in a range from about any of the foregoing amounts to about any other of the foregoing amounts.

In exemplary embodiments, the diamine component may include the diamine represented by Formula 2 in an amount from about 5 to about 20 mol %, for example, about 5 to about 15 mol %, based on about 100 mol % of the diamine component. In some embodiments, the diamine component may include the diamine represented by Formula 2 in an amount of about 5, 6, 7, 8, 9, 10, 11, 12, 13, 14, 15, 16, 17, 18, 19, or 20 mol %. Further, according to some embodiments of the present invention, the amount of the diamine represented by Formula 2 can be in a range from about any of the foregoing amounts to about any other of the foregoing amounts.

Within these ranges, the obtained copolymerized polyamide resin may have excellent workability, superior heat resistance, and the like, and may exhibit reduced or no gel generation and yellowing phenomenon in a molding process.

The copolymerized polyamide resin according to the present invention may have a mole ratio of the dicarboxylic acid component (A) and the diamine component (B) ((A):(B)) from about 1:about 0.95 to about 1:about 1.15, for example, from about 1:about 0.95 to about 1:about 1.10. Within these ranges, the copolymerized polyamide resin may have an excellent terminal reactivity, and thus may be prepared within the proper polymerization periods.

The copolymerized polyamide resin according to the present invention may have a terminal group encapsulated with an end capping agent. The end capping agent may include at least one of an aliphatic carboxylic acid and/or an aromatic carboxylic acid, for example, without limitation, acetic acid, propionic acid, butyric acid, valeric acid, caproic acid, caprylic acid, lauric acid, tridecanoic acid, myristic acid, palmitic acid, stearic acid, pivalic acid, isobutyric acid, benzoic acid, toluic acid, α-naphthalene carboxylic acid, β-naphthalene carboxylic acid, methylnaphthalene carboxylic acid, and the like and mixtures thereof.

The copolymerized polyamide resin may include an end capping agent in an amount, without limitation, from about 0.01 to about 5 parts by mole, for example, about 0.1 to about 3 parts by mole, based on about 100 parts by mole of the dicarboxylic acid (A) and the diamine (B). Within these ranges, the molecular weight of the copolymerized polyamide resin may be easily adjusted.

The copolymerized polyamide resin of the present invention may be prepared according to the conventional process for preparing polyamide, for example, by polymerizing the monomer mixture comprising the dicarboxylic acid component (A) and the diamine component (B).

The polymerization may be performed by the conventional polymerization method, for example, a melt polymerization method, wherein the polymerization temperature may range from about 80 to about 280° C., for example, from about 90 to about 270° C., and the polymerization pressure may range from about 10 to about 40 kgf/cm², without being limited thereto.

In exemplary embodiments, the copolymerized polyamide resin may be prepared by polymerizing the monomer mixture to obtain a prepolymer; and performing a solid state polymerization of the prepolymer. For example, the copolymerized polyamide resin may be obtained by a process including: placing the monomer mixture, a catalyst and water in a reactor, stirring the mixture at about 80 to about 150° C. for about 0.5 to about 2 hours, maintaining the mixture at about 200 to about 220° C. under a pressure of about 20 to about 40 kgf/cm² for about 1 to about 4 hours and lowering the pressure to about 10 to about 30 kgf/cm², followed by performing the reaction (copolymerization) for about 1 to about 3 hours to obtain a polyamide prepolymer, and performing a solid state polymerization (SSP) of the prepolymer at a temperature between a glass transition temperature (Tg) and a melting temperature (Tm) in a vacuum for about 2 to about 20 hours.

The prepolymer may have an intrinsic viscosity [η], without limitation, from about 0.1 dL/g to about 0.4 dL/g, for example, from about 0.1 dL/g to about 0.3 dL/g, as measured in about 98% sulfuric acid solution at 25° C. using an Ubbelohde viscometer. Within these ranges, the copolymerized polyamide resin may be easily withdrawn from the reactor.

In exemplary embodiments, the solid state polymerization may comprise heating the prepolymer to a temperature of about 150 to about 220° C., for example, about 180 to about 210° C. in a vacuum or in the presence of an inert gas, such as nitrogen, argon, etc. Within these ranges, the copolymerized polyamide resin may have a weight average molecular weight from about 5,000 to about 50,000 g/mol.

A catalyst may be used in the copolymerization reaction. The catalyst may be a phosphorus catalyst, for example, phosphoric acid, phosphorous acid, hypophosphorous acid, salts thereof, derivatives thereof, and the like, and mixtures thereof. In exemplary embodiments, the catalyst may include phosphoric acid, phosphorous acid, hypophosphorous acid, sodium hypophosphate, sodium hypophosphinate, and the like, and mixtures thereof.

The catalyst may be present in an amount of about 3 parts by weight or less, for example, from about 0.001 parts by weight to about 1 part by weight, and as another example from about 0.01 parts by weight to about 0.5 parts by weight, based on about 100 parts by weight of the total monomer mixture, without being limited thereto.

Furthermore, in the process for preparing the polyamide resin, the end capping agent may be used in an amount as described above, and the viscosity of the prepared copolymerized polyamide resin may be adjusted by adjusting the amount of the end capping agent.

The copolymerized polyamide resin of the present invention may be characterized as having a difference between a melting temperature (Tm) and a crystallization temperature (Tc) of about 50° C. or more, for example, from about 50 to about 70° C., and as another example from about 55 to about 65° C. If the difference between the melting temperature (Tm) and the crystallization temperature (Tc) of the copolymerized polyamide resin is less than about 50° C., then a deteriorated appearance quality such as the projection or protrusion of inorganics from a surface of a molded product produced using the resin can occur after melt processing since the crystallization rate becomes faster.

In exemplary embodiments, the copolymerized polyamide resin may have a melting temperature (Tm) from about 220 to about 250° C., for example, about 230 to about 250° C., and as another example from about 230 to about 245° C., and a crystallization temperature (Tc) from about 170 to about 200° C., for example, from about 170 to about 190° C. Within these ranges, the copolymerized polyamide resin may have excellent moldability when preparing a molded article requiring heat resistance and good appearance properties.

Furthermore, the copolymerized polyamide resin may have a glass transition temperature (Tg) from about 90 to about 110° C., for example, about 95 to about 105° C. Within these ranges, the copolymerized polyamide resin may have excellent heat resistance.

In exemplary embodiments, the copolymerized polyamide resin may have an intrinsic viscosity from about 0.6 to about 1.4 dL/g, for example, about 0.7 to about 1.3 dL/g, as measured at 25° C. after dissolving at a concentration of about 0.5 g/dL in a concentrated sulfuric acid solution (about 98%), and an intrinsic viscosity (IV) difference ($\Delta IV$) of about 0.14 or less, for example, from about 0.01 to about 0.10 according to Equation 1 below. Within these ranges, when melt processing the copolymerized polyamide resin, it is possible to reduce or prevent gel generation.

$$\text{Intrinsic viscosity difference}(\Delta IV) = IV_1 - IV_0 \quad [\text{Equation 1}]$$

wherein, $IV_0$ is an intrinsic viscosity of the copolymerized polyamide resin, as measured at about 25° C., and $IV_1$ is an intrinsic viscosity, as measured by melting about 10 g of the copolymerized polyamide resin at about 260° C. and leaving the melted copolymerized polyamide resin for about 30 minutes, followed by cooling it to about 25° C.

In exemplary embodiments, the copolymerized polyamide resin may have a gel content of about 0.4% or less, for example, about 0.01 to about 0.30%, as measured by melting about 10 g of a sample of the copolymerized polyamide resin at about 260° C. and leaving the melted copolymerized polyamide resin for about 30 minutes, followed by cooling it to an ambient temperature. The gel content may be calculated according to Equation 2 as below.

$$\text{Gel content (\%)} = [W_1/W_0] \times 100 \quad [\text{Equation 2}]$$

wherein, $W_0$ is a mass of the sample (about 10 g), as measured by melting about 10 g of the sample of the copolymerized polyamide resin at about 260° C. and leaving the melted copolymerized polyamide resin for about 30 minutes, followed by cooling it to an ambient temperature, and $W_1$ is a mass of the filtered material (gel), as measured by dissolving the sample in about 100 mL of hexafluoroisopropanol (HFIP), pouring the solution into a filter paper, subjecting the resulting filtered material at about 80° C. in a vacuum oven, and vacuum drying the material at about 10 torr of degree of vacuum for about 5 hours.

In exemplary embodiments, the copolymerized polyamide resin may have a Yellowness Index change ($\Delta YI$) of about 20 or less, for example, from about 10 to about 20, and as another example from about 13 to about 18, wherein the $\Delta YI$ is determined by measuring the YI of a copolymerized polyamide resin sample before and after maintaining the sample at about 200° C. for about 1 hour. The gel content may be calculated according to Equation 2 above.

In exemplary embodiments, the copolymerized polyamide resin may have a Yellowness Index change ($\Delta YI$) of about 20 or less, for example, from about 10 to about 20, and more particularly from about 13 to about 18, wherein the $\Delta YI$ is determined by measuring the YI of a copolymerized polyamide resin sample before and after a scorch test, wherein the scorch test includes leaving about 1 to about 3 g of the resin at about 200° C. for about 1 hour. The Yellowness Index difference ($\Delta YI$) may be calculated according to Equation 3 as below.

$$\text{Yellowness Index difference}(\Delta YI) = YI_1 - YI_0 \quad [\text{Equation 3}]$$

wherein, $YI_0$ is a Yellowness Index (YI) value of the copolymerized polyamide resin before the scorch test, as measured according to ASTM E313-73, and $YI_1$ is a Yellowness Index value of the copolymerized polyamide resin after the scorch test which includes leaving about 1 to about 3 g of the copolymerized polyamide resin at about 200° C. for about 1 hour.

In exemplary embodiments, the copolymerized polyamide resin may have a weight average molecular weight from about 5,000 to about 50,000 g/mol as measured by a gel permeation chromatography (GPC), without being limited thereto.

A molded article according to the present invention may be prepared from the copolymerized polyamide resin. For example, the copolymerized polyamide resin may be used for packing films, barrier bottle applications, cases for electrical and electronic devices, exterior materials of vehicles, and the like, without being limited thereto, requiring heat resistance, melt workability, discoloration resistance, and the like. The molded article can be easily prepared by those skilled in the art.

Next, the present invention will be explained in more detail with reference to the following examples. However, it should be understood that these examples are provided for illustration only and are not to be in any way construed as limiting the present invention.

EXAMPLES

Example 1

A monomer mixture comprising 0.630 mol (92.07 g) of adipic acid and 0.070 mol (12.05 g) of 1,4-cyclohexane dicarboxylic acid as a dicarboxylic acid component (A), and 0.665 mol (90.57 g) of m-xylene diamine and 0.035 mol (7.36 g) of bis(4-aminocyclohexyl)methane (PACM) as a diamine component (B), 0.11 g of sodium hypophosphate as a catalyst and 28 ml of distilled water are placed in a 1 L autoclave, which in turn is filled with nitrogen. Next, after stirring the components at 130° C. for 60 minutes, the mixture is heated to 210° C. for 1 hour and left for 1 hour at a pressure of 13 kgf/cm². After flashing the mixture, it is separated into water and a polyamide pre-copolymer. The separated polyamide pre-copolymer (intrinsic viscosity [η]=0.21 dL/g) is put into a tumbler type reactor, and is subject to solid state polymerization at 190° C. for 5 hours. Then, the polyamide pre-copolymer is cooled slowly to an ambient temperature to obtain a copolymerized polyamide resin.

Example 2

A copolymerized polyamide resin is prepared in the same manner as in Example 1 except that 0.630 mol (85.81 g) of m-xylene diamine and 0.070 mol (14.72 g) of bis(4-aminocyclohexyl)methane instead of 0.665 mol (90.57 g) of m-xylene diamine and 0.035 mol (7.36 g) of bis(4-aminocyclohexyl)methane as the diamine component (B) are used.

Example 3

A copolymerized polyamide resin is prepared in the same manner as in Example 1 except that 0.595 mol (81.04 g) of m-xylene diamine and 0.105 mol (22.09 g) of bis(4-aminocyclohexyl)methane instead of 0.665 mol (90.57 g) of m-xylene diamine and 0.035 mol (7.36 g) of bis(4-aminocyclohexyl)methane as the diamine component (B) are used.

Example 4

A copolymerized polyamide resin is prepared in the same manner as in Example 1 except that 0.665 mol (97.18 g) of adipic acid and 0.035 mol (6.03 g) of 1,4-cyclohexane dicarboxylic acid instead of 0.630 mol (92.07 g) of adipic acid and 0.070 mol (12.05 g) of 1,4-cyclohexane dicarboxylic acid as the dicarboxylic acid component (A), and 0.595 mol (81.04 g) of m-xylene diamine and 0.105 mol (22.09 g) of bis(4-aminocyclohexyl)methane instead of 0.665 mol (90.57 g) of m-xylene diamine and 0.035 mol (7.36 g) of bis(4-aminocyclohexyl)methane as the diamine component (B) are used.

Example 5

A copolymerized polyamide resin is prepared in the same manner as in Example 2 except that the conditions in the solid state polymerization are changed from 190° C. and 5 hours to 200° C. and 7 hours.

Comparative Example 1

A copolymerized polyamide resin is prepared in the same manner as in Example 1 except that 0.70 mol (102.30 g) of adipic acid only is used as the dicarboxylic acid component (A), and 0.70 mol (95.34 g) of m-xylene diamine only is used as the diamine component (B).

Comparative Example 2

A copolymerized polyamide resin is prepared in the same manner as in Example 1 except that 0.70 mol (102.30 g) of adipic acid only is used as the dicarboxylic acid component (A).

Comparative Example 3

A copolymerized polyamide resin is prepared in the same manner as in Example 1 except that 0.70 mol (95.33 g) of m-xylene diamine only is used as the diamine component (B).

Comparative Example 4

A copolymerized polyamide resin is prepared in the same manner as in Example 1 except that 0.595 mol (86.95 g) of adipic acid and 0.105 mol (18.08 g) of 1,4-cyclohexane dicarboxylic acid are used instead of 0.630 mol (92.07 g) of adipic acid and 0.070 mol (12.05 g) of 1,4-cyclohexane dicarboxylic acid as the dicarboxylic acid component (A), and 0.70 mol (95.33 g) of m-xylene diamine only is used as the diamine component (B).

Comparative Example 5

A copolymerized polyamide resin is prepared in the same manner as in Example 2 except that 0.630 mol (85.81 g) of m-xylene diamine and 0.070 mol (9.53 g) of p-xylene diamine instead of 0.630 mol (85.81 g) of m-xylene diamine and 0.070 mol (14.72 g) of his (4-aminocyclohexyl)methane as the diamine component (B) are used.

Experimental Example

The polyamide resins prepared in Examples and Comparative Examples are evaluated with respect to a melting temperature, a crystallization temperature, a glass transition temperature, an intrinsic viscosity, a fluidity, an absorption rate and a gas generation amount by the following methods. Results are shown in Table 1.

Physical Property Evaluation (1) Melting temperature (Tm), crystallization temperature (Tc) and glass transition temperature (Tg) (unit: ° C.): Melting temperature, crystallization temperature and glass transition temperature are measured on each of the polyamide resins obtained after solid state polymerization in the Examples and Comparative Examples using a differential scanning calorimeter (DSC). The DSC is a Q20 instrument (TA Co., Ltd.). For measurement of crystallization temperature, a 5 mg to 10 mg of specimen is dried (to 3,000 ppm or less of moisture) at 80° C. for 4 hours in a vacuum, heated from 30° C. to 400° C. at a rate of 10° C./min in a nitrogen atmosphere, and then left at 400° C. for 1 minute. Then, the specimen is cooled at a rate of 10° C./min to obtain an exothermic peak, from which crystallization temperature is measured. Further, glass transition temperature and melting temperature are measured from transition temperature and a maximum point of an endothermic peak obtained while the specimen is heated to 400° C. at a rate of 10° C./min (2nd scan) after the specimen is maintained at 30° C. for 1 minute after measurement of the crystallization temperature, respectively.

(2) Intrinsic viscosity (IV, unit: dL/g): An intrinsic viscosity is measured by dissolving the resin at a concentration of 0.5 g/dL in a 98% sulfuric acid solution at 25° C. using an Ubbelohde viscometer.

(3) Intrinsic viscosity difference (ΔIV): An intrinsic viscosity difference (ΔIV) before and after melt processing is measured according to Equation 1 as below.

$$\text{Intrinsic viscosity difference}(\Delta IV) = IV_1 - IV_0 \qquad [\text{Equation 1}]$$

wherein, $IV_0$ is an intrinsic viscosity of the copolymerized polyamide resin, as measured at 25° C., and $IV_1$ is an intrinsic viscosity, as measured by melting 10 g of the copolymerized polyamide resin at 260° C. and leaving the melted copolymerized polyamide resin for 30 minutes, followed by cooling it to 25° C.

(4) Gel content (unit: %): A gel content after melt processing is measured according to Equation 2 as below.

$$\text{Gel content } (\%) = [W_1/W_0] \times 100 \qquad [\text{Equation 2}]$$

wherein, $W_0$ is a mass of the sample (10 g), as measured by melting 10 g of the sample of the copolymerized polyamide resin at 260° C. and leaving the sample for 30 minutes, followed by cooling it to an ambient temperature, and $W_1$ is a mass of the filtered material (gel), as measured by dissolving the sample in 100 mL of hexafluoroisopropanol (HFIP), pouring the solution into a filter paper, subjecting the resulting filtered material at 80° C. in a vacuum oven, and vacuum drying the material at 10 torr of degree of vacuum for 5 hours.

(5) Yellowness Index difference (ΔYI): A yellowness Index difference (ΔYI) before and after a scorch test is measured according to Equation 3 as below.

Yellowness Index difference(ΔYI)=YI$_1$×YI$_0$ [Equation 3]

wherein, YI$_0$ is a Yellowness Index (YI) value of the copolymerized polyamide resin before the scorch test, as measured according to ASTM E313-73, and YI$_1$ is a Yellowness Index value of the copolymerized polyamide resin after the scorch test, wherein the scorch test includes leaving 1 to 3 g of the copolymerized polyamide resin at 200° C. for 1 hour.

TABLE 1

|  |  | Examples | | | | | Comparative Examples | | | | |
|---|---|---|---|---|---|---|---|---|---|---|---|
|  |  | 1 | 2 | 3 | 4 | 5 | 1 | 2 | 3 | 4 | 5 |
| (A) | Adipic acid | 90 | 90 | 90 | 95 | 90 | 100 | 100 | 90 | 85 | 90 |
|  | 1,4-Cyclohexane dicarboxylic acid | 10 | 10 | 10 | 5 | 10 | — | — | 10 | 15 | 10 |
| (B) | m-Xylene diamine | 95 | 90 | 85 | 85 | 90 | 100 | 95 | 100 | 100 | 90 |
|  | Bis (4-aminocyclohexyl)methane | 5 | 10 | 15 | 15 | 10 | — | 5 | — | — | — |
|  | p-Xylene diamine | — | — | — | — | — | — | — | — | — | 10 |
|  | Melting temperature (° C.) | 245 | 240 | 233 | 238 | 240 | 235 | 230 | 248 | 255 | 250 |
|  | Crystallization temperature (° C.) | 190 | 185 | 170 | 175 | 180 | 190 | 185 | 199 | 206 | 203 |
|  | Difference between melting temperature and crystallization temperature | 55 | 55 | 63 | 63 | 60 | 45 | 45 | 49 | 49 | 47 |
|  | Glass transition temperature (° C.) | 95 | 100 | 103 | 100 | 102 | 84 | 89 | 90 | 103 | 106 |
|  | Intrinsic viscosity (dL/g) | 0.85 | 0.88 | 0.86 | 0.85 | 1.20 | 0.84 | 0.88 | 0.84 | 0.88 | 0.86 |
|  | Intrinsic viscosity difference (ΔIV) between before and after melt processing | 0.10 | 0.07 | 0.04 | 0.05 | 0.08 | 0.20 | 0.17 | 0.19 | 0.21 | 0.18 |
|  | Gel content (%) after melt processing | 0.30 | 0.22 | 0.10 | 0.26 | 0.25 | 0.50 | 0.48 | 0.48 | 0.51 | 0.49 |
|  | Yellowness Index difference (ΔYI) between before and after scorch test | 18 | 15 | 10 | 14 | 16 | 30 | 27 | 28 | 25 | 28 |

It can be seen that copolymerized polyamide resins according to the present invention exhibit excellent heat resistance, and reduced or no gel generation and yellowing phenomenon in a molding process.

In contrast, for Comparative Examples 1 to 5, which did not use the alicyclic dicarboxylic acid and/or the alicyclic diamine comprising two or more cyclohexyl groups, it can be seen that the polyamide resins have a difference between the melting temperature and the crystallization temperature of less than 50° C., an increased intrinsic viscosity, an increased gel content, a decreased heat discoloration resistance (Yellowness Index difference), and the like in a melting process.

Many modifications and other embodiments of the invention will come to mind to one skilled in the art to which this invention pertains. Therefore, it is to be understood that the invention is not to be limited to the specific embodiments disclosed and that such modifications and other embodiments are intended to be included within the scope of the appended claims.

What is claimed is:

1. A copolymerized polyamide resin including a polymer of a monomer mixture comprising a dicarboxylic acid component comprising adipic acid in an amount from about 88 to about 95 mol % and 1,4-cyclohexane dicarboxylic acid in an amount from about 5 to about 12 mol %, each based on 100 mol % of the dicarboxylic acid component, and a diamine component comprising m-xylene diamine in an amount from about 80 to about 95 mol % and bis(4-aminocyclohexyl)methane in an amount from about 5 to about 20 mol %, each based on 100 mol % of the diamine component,
wherein the copolymerized polyamide resin has a difference between a melting temperature (Tm) and a crystallization temperature (Tc) of about 50° C. or more, and
wherein the copolymerized polyamide resin has a Yellowness Index difference (ΔYI) of about 20 or less calculated according to Equation 3 below:

Yellowness Index difference (ΔYI)=YI$_1$−YI$_0$ [Equation 3]

wherein YI$_0$ is a Yellowness Index (YI) value of the copolymerized polyamide resin before a scorch test and YI$_1$ is a Yellowness Index value of the copolymerized polyamide resin after a scorch test, as measured according to ASTM E313-73, wherein the scorch test includes leaving about 1 to about 3 g of the copolymerized polyamide resin at about 200° C. for about 1 hour.

2. The copolymerized polyamide resin according to claim 1, wherein the copolymerized polyamide resin has a mole ratio of the dicarboxylic acid component and the diamine component (dicarboxylic acid component:diamine component) from about 1:about 0.95 to about 1:about 1.15.

3. The copolymerized polyamide resin according to claim 1, wherein the copolymerized polyamide resin has a terminal group encapsulated with an end capping agent comprising an aliphatic carboxylic acid, an aromatic carboxylic acid, or a mixture thereof.

4. The copolymerized polyamide resin according to claim 1, wherein the copolymerized polyamide resin has a melting temperature (Tm) from about 220 to about 250° C., a crystallization temperature (Tc) from about 170 to about 200° C., and a glass transition temperature (Tg) from about 90 to about 110° C.

5. The copolymerized polyamide resin according to claim 1, wherein the copolymerized polyamide resin has an intrinsic viscosity (IV) difference (ΔIV) of about 0.14 or less according to Equation 1:

Intrinsic viscosity difference (ΔIV)=IV$_1$−IV$_0$ [Equation 1]

wherein, $IV_0$ is an intrinsic viscosity of the copolymerized polyamide resin, as measured at about 25° C., and $IV_1$ is an intrinsic viscosity, as measured by melting about 10 g of the copolymerized polyamide resin at about 260° C. and leaving the melted copolymerized polyamide resin for about 30 minutes, followed by cooling the copolymerized polyamide resin to about 25° C.

6. The copolymerized polyamide resin according to claim 1, wherein the copolymerized polyamide resin has a gel content of about 0.4% or less, as measured by melting about 10 g of the copolymerized polyamide resin at about 260° C. and leaving the melted copolymerized polyamide resin for about 30 minutes, followed by cooling the copolymerized polyamide resin to an ambient temperature.

7. A method for preparing a copolymerized polyamide resin comprising:
  polymerizing a monomer mixture comprising a dicarboxylic acid component comprising adipic acid in an amount from about 88 to about 95 mol % and 1,4-cyclohexane dicarboxylic acid in an amount from about 5 to about 12 mol %, each based on 100 mol % of the dicarboxylic acid component, and a diamine component comprising m-xylene diamine in an amount from about 80 to about 95 mol % and bis(4-aminocyclohexyl)methane in an amount from about 5 to about 20 mol %, each based on 100 mol % of the diamine component,
  wherein the copolymerized polyamide resin has a difference between a melting temperature (Tm) and a crystallization temperature (Tc) of about 50° C. or more, and
  wherein the copolymerized polyamide resin has a Yellowness Index difference (ΔYI) of about 20 or less calculated according to Equation 3 below:

$$\text{Yellowness Index difference } (\Delta YI) = YI_1 - YI_0 \quad \text{[Equation 3]}$$

wherein $YI_0$ is a Yellowness Index (YI) value of the copolymerized polyamide resin before a scorch test and $YI_1$ is a Yellowness Index value of the copolymerized polyamide resin after a scorch test, as measured according to ASTM E313-73, wherein the scorch test includes leaving about 1 to about 3 g of the copolymerized polyamide resin at about 200° C. for about 1 hour.

8. The method for preparing a copolymerized polyamide resin according to claim 7, comprising polymerizing the monomer mixture to obtain a prepolymer; and performing a solid state polymerization of the prepolymer.

9. The method of preparing copolymerized polyamide resin according to claim 7, the prepolymer has an intrinsic viscosity from about 0.1 to about 0.4 dL/g.

10. The method of preparing copolymerized polyamide resin according to claim 7, wherein the solid state polymerization comprises heating the prepolymer to a temperature of about 150 to about 220° C.

11. A molded article formed from the copolymerized polyamide resin according to claim 1.

12. The copolymerized polyamide resin according to claim 1, wherein the copolymerized polyamide resin has a Yellowness Index change (ΔYI) of from about 10 to about 20.

13. The copolymerized polyamide resin according to claim 12, wherein the copolymerized polyamide resin has a Yellowness Index change (ΔYI) of from about 10 to about 18.

* * * * *

UNITED STATES PATENT AND TRADEMARK OFFICE
CERTIFICATE OF CORRECTION

PATENT NO. : 9,902,808 B2
APPLICATION NO. : 14/583429
DATED : February 27, 2018
INVENTOR(S) : So Young Kwon et al.

It is certified that error appears in the above-identified patent and that said Letters Patent is hereby corrected as shown below:

In the Specification

Column 11, delete Line 7 and insert:
--Yellowness Index difference ($\Delta YI$) = $YI_1$ - $YI_0$ [Equation 3]--

Signed and Sealed this
Twenty-fourth Day of July, 2018

Andrei Iancu
*Director of the United States Patent and Trademark Office*